US008668168B1

(12) United States Patent
Kelley et al.

(10) Patent No.: US 8,668,168 B1
(45) Date of Patent: Mar. 11, 2014

(54) SPACE VEHICLE VALVE SYSTEM

(75) Inventors: Anthony R. Kelley, Sommerville, AL (US); Jeffrey L. Lindner, Madison, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 37 days.

(21) Appl. No.: 13/326,513

(22) Filed: Dec. 15, 2011

(51) Int. Cl.
*B64G 1/00* (2006.01)
*F16K 15/00* (2006.01)
*F16K 17/00* (2006.01)
*F16K 21/04* (2006.01)
*F16K 15/16* (2006.01)

(52) U.S. Cl.
USPC .............. 244/158.1; 137/512.1; 137/855

(58) Field of Classification Search
USPC .......... 137/512.1, 512.15, 855, 512; 454/162, 454/164; 123/73 V; 244/158.1
See application file for complete search history.

(56) References Cited

U.S. PATENT DOCUMENTS

| 4,604,865 | A |   | 8/1986 | Otani et al. |
| 5,245,956 | A | * | 9/1993 | Martin .................. 123/73 V |
| 5,390,699 | A |   | 2/1995 | Yamada |
| 5,591,080 | A |   | 1/1997 | Ward |
| 6,106,385 | A |   | 8/2000 | Humphrey et al. |
| 6,183,360 | B1 |  | 2/2001 | Luter, II et al. |
| 6,289,818 | B1 | * | 9/2001 | Mueller et al. ............... 102/377 |
| 6,364,145 | B1 |  | 4/2002 | Shaw et al. |
| 6,468,148 | B1 |  | 10/2002 | Furusawa et al. |
| 6,969,314 | B2 | * | 11/2005 | Misner ......................... 454/164 |
| 7,517,280 | B2 |  | 4/2009 | McConnell et al. |
| 2003/0019527 | A1 | * | 1/2003 | Oppermann et al. ..... 137/512.15 |

* cited by examiner

*Primary Examiner* — John Rivell
*Assistant Examiner* — Michael R Reid
(74) *Attorney, Agent, or Firm* — Absolute Technology Law Group, LLC; James J. McGroary

(57) ABSTRACT

The present invention is a space vehicle valve system which controls the internal pressure of a space vehicle and the flow rate of purged gases at a given internal pressure and aperture site. A plurality of quasi-unique variable dimension peaked valve structures cover the purge apertures on a space vehicle. Interchangeable sheet guards configured to cover valve apertures on the peaked valve structure contain a pressure-activated surface on the inner surface. Sheet guards move outwardly from the peaked valve structure when in structural contact with a purge gas stream flowing through the apertures on the space vehicle. Changing the properties of the sheet guards changes the response of the sheet guards at a given internal pressure, providing control of the flow rate at a given aperture site.

20 Claims, 9 Drawing Sheets

SPACE VEHICLE VALVE SYSTEM

FEDERAL RESEARCH STATEMENT

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

CROSS-REFERENCES TO RELATED APPLICATIONS

None.

FIELD OF INVENTION

The present invention relates to valves, and specifically to a system of valves for space vehicles.

TERMINOLOGY

As used herein, the term "attachment segment" refers to a portion of a sheet guard which is attached to a valve structure.

As used herein, the term "controlled internal pressure" means a measurable internal pressure which may be dynamically or statically controlled by any means known in the art, including, but not limited to, valves, pumps, vents, membranes, and combinations of these and other structures or devices. A controlled internal pressure may be controlled to maintain a pre-calculated or target minimum, maximum or average value.

As used herein, the term "interchangeable" means able to be replaced with alternative components.

As used herein, the term "physical property" refers to any property of a pressure-activated surface which may be altered. Physical properties include, but are not limited to, number, size, shape, geometry, length, thickness, flexibility, stiffness, rigidity, angle, material, number of sides, and combinations of these properties.

As used herein, the term "purge gas stream" refers to the physical path of gas flow from high pressure to low pressure when purged or vented from a system.

As used herein, the term "quasi-unique" means different than other structural components of a system.

As used herein, the term "sheet guard" refers to any adapted to cover a vent aperture and interface with a purge gas stream.

As used herein, the term "target flow rate" means a pre-determined flow rate to be maintained.

As used herein, the term "variable dimension" refers to a structural component capable of having different dimensions, including, but not limited to, size, geometric shape, arrangement, configuration and combinations of these properties. A variable dimension structural component may need to be specifically manufactured with different dimensions or may be adapted to change dimensions without remanufacture.

BACKGROUND OF THE INVENTION

Rockets and other space vehicles need a dry gas purge system to keep flammable vapors and water out of closed compartments while the rocket or vehicle goes through assembly, sits on the pad ready to launch, and is loaded with propellants, and during the actual flight. The vent system must prevent animal entry, gas back flow, explosive gas accumulation, and rain or moisture entry in order to protect sensitive equipment and instruments from damage or explosion.

Purge openings are also used to vent gases to prevent the internal pressure of a rocket and other space vehicles from reaching critical levels and damaging the rocket housing or internal components. High pressures may also cause rupture or explosions, putting observers, crews and other personnel at risk for injury.

It is also important to maintain purge gas circulation in general in rockets. Purge gases, such as dry nitrogen or helium, are circulated to keep components dry before propellants are introduced. As propellants are introduced, circulation must be increased to prevent the buildup of explosive gases or to prevent the creation of flammable liquefied air.

Purge openings are usually covered by a valve to prevent water and debris from entering the rocket cavities. The most common valve known in the art is a spring-loaded flapper valve. Pressure inside a rocket or other space vehicle pushes against the flapper door, causing the flap to open and gases to escape. The greater the internal pressure, the further the flap will open, and the greater the flow rate. With lower internal pressures, the flap will not open as far, and the flow rate will decrease.

One problem with flapper valves, however, is the inability to control the flow rate over a range of internal pressures. With flapper valves, in order to change the flow rate at a given internal pressure, the size of the purge valve itself must be changed or the springs replaced to allow more or less gas to pass through at a given pressure.

Other valve designs used in the past have attempted to overcome the problems known with flapper valves. However, these designs have incorporated multiple moving parts and are complicated, mechanical assemblies. Because of the number of moving parts, these valves are prone to damage, it is may be difficult or costly to continuously replace broken or disabled valves. Additionally, under certain high wind conditions, many of these devices can allow entry of humid, contaminated air to vented spaces.

Valve designs known in the art also generate significant noise as gases are purged. Because of the design of these valves, acoustical energy is propagated equally in all directions. At typical flow rates, workers, observers, and anyone near the rocket must wear ear protection to avoid injury.

Reed valves, a type of check valve known in the art, begin to overcome some of the problems known with flapper valves and complex mechanical valves. Reed valves use a pedal or pedals to selectively cover an aperture. When the pressure inside the valve is greater than the pressure outside the valve, the pedals are pushed away from the valve, allowing gases or fluids to pass through the valve opening.

Reed valves are most commonly used in two-stroke engines to control the fuel-air mixture admitted to the cylinder. Reed valves are specifically designed to open and quickly snap closed 100s of times a second in time with the engine's cycle. Current reed valves are not designed to open and remain open for long durations. Current reed valves are also not designed to maintain a cavity's pre-determined internal pressure and self-regulate flow rate to maintain the internal pressure or flow balance between cavities.

It is desirable to design a valve system which maintains a constant internal pressure and automatically adjusts to a desired flow rate.

It is desirable to design a valve system which limits the area in which harmful acoustical energy is released.

It is further desirable to design a valve system using modified off-the-shelf components with a minimal requirement for mechanical changes.

SUMMARY OF THE INVENTION

The present invention is a space vehicle valve system which controls the internal pressure of a space vehicle and the flow rate of purged gases at a given internal pressure. A plurality of quasi-unique variable dimension peaked valve structures cover the purge apertures on a space vehicle. Interchangeable sheet guards configured to cover valve apertures on the peaked valve structure contain a pressure-activated surface on the inner surface. Sheet guards move outwardly from the peaked valve structure when in structural contact with a purge gas stream flowing through the apertures on the space vehicle. Changing the properties of the sheet guards changes the response of the sheet guards at a given internal pressure, providing control of the flow rate at a given aperture site.

DETAILED DESCRIPTION

Figure 1:
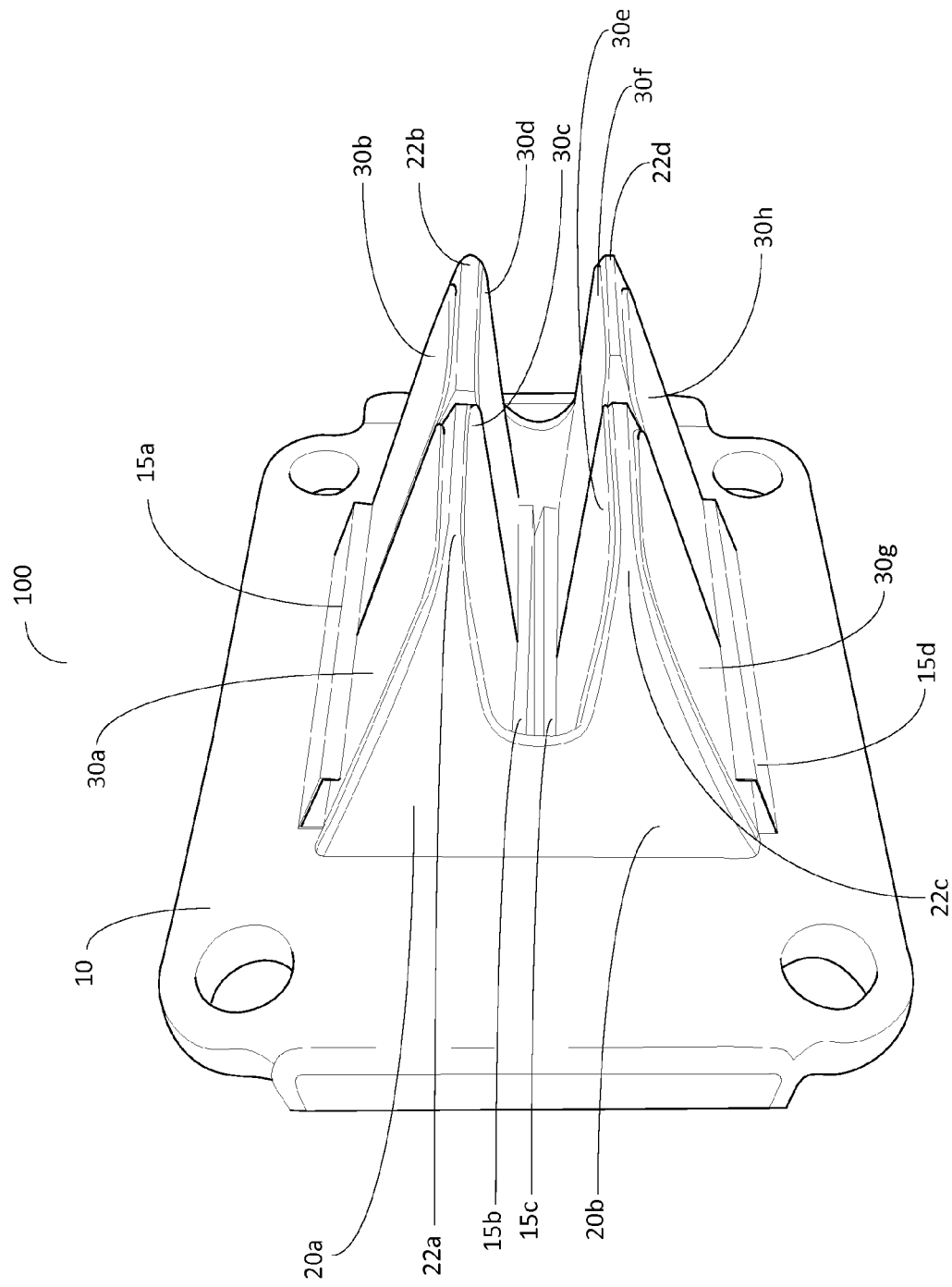
FIG. 1 is an exemplary embodiment of a peaked valve structure for use with a space vehicle valve system.

For the purpose of promoting an understanding of the present invention, references are made in the text to exemplary embodiments of a space vehicle valve system, only some of which are described herein. It should be understood that no limitations on the scope of the invention are intended by describing these exemplary embodiments. One of ordinary skill in the art will readily appreciate that alternate but functionally equivalent materials, components, and steps may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 is an exterior view of an exemplary embodiment of peaked valve structure 100 for use with space vehicle valve system 200 (not shown). Base 10 contains two pyramidal valve protuberances 20a, 20b, each divided into two valve segments 22a, 22b, 22c, 22d. Each valve segment contains two sheet guards 30a, 30b, 30c, 30d, 30e, 30f, 30g, 30h, which cover valve apertures 25a, 25b, 25c, 25d, 25e, 25f, 25g, 25h (not shown), respectively.

Sheet guards 30a, 30b, 30c, 30d, 30e, 30f, 30g, 30h each contain an inner surface and an outer surface. The inner surface of each sheet guard 30a, 30b, 30c, 30d, 30e, 30f, 30g, 30h is a pressure-sensitive surface designed to physically react when aligned with a purge gas stream.

When in use, peaked valve structure 100 is affixed on a surface of a vessel having a purge aperture such that the exterior of base 10 is facing away from the vessel and may have optional rain covers or screens. Peaked valve structure 100 is used to control the pressure within vessel and the flow rate of gases or liquids out of the vessel. As pressure builds up within a vessel, gases attempt to exit the vessel, and the pressure-activated surfaces of sheet guards 30a, 30b, 30c, 30d, 30e, 30f, 30g, 30h are aligned with the purge gas stream created. Sheet guards 30a, 30b, 30c, 30d, 30e, 30f, 30g, 30h are therefore pushed away from base 10, exposing valve apertures 25a, 25b, 25c, 25d, 25e, 25f, 25g, 25h (not shown) and enabling flow through peaked valve structure 100.

In the exemplary embodiment shown, sheet guards 30a, 30b, 30c, 30d, 30e, 30f, 30g, 30h are all rectangular and made of carbon fiber. Because sheet guards 30a, 30b, 30c, 30d, 30e, 30f, 30g, 30h are identical, they will respond identically to a given internal pressure and allow the same flow rate at the given internal pressure. For example, sheet guards 30a, 30b, 30c, 30d, 30e, 30f, 30g, 30h may having a cracking pressure, or pressure at which sheet guards 30a, 30b, 30c, 30d, 30e, 30f, 30g, 30h initially push away from base 10, of 0.1 psi. At 0.1 psi, each of sheet guards 30a, 30b, 30c, 30d, 30e, 30f, 30g, 30h will be pushed an equal distance from base 10 and allow the same flow rate through valve apertures 25a, 25b, 25c, 25d, 25e, 25f, 25g, 25h (not shown).

Identical sheet guards 30a, 30b, 30c, 30d, 30e, 30f, 30g, 30h will also respond the same to increases in internal pressure. For example, for each incremental change in internal pressure, sheet guards 30a, 30b, 30c, 30d, 30e, 30f, 30g, 30h will identically expose more of valve apertures 25a, 25b, 25c, 25d, 25e, 25f, 25g, 25h (not shown) to increase flow rate while maintaining low pressure.

In further exemplary embodiments, physical properties of sheet guards 30a, 30b, 30c, 30d, 30e, 30f, 30g, 30h may be manipulated based on the desired internal pressure to be maintained and the desired flow rate. For example, properties including, but not limited to, geometry, shape, dimensions, thickness, stiffness (measured in k), material, length, and combinations of these properties may be altered. Space vehicle valve system 200 may include multiple peaked valve structures 100 containing sheet guards 30a, 30b, 30c, 30d, 30e, 30f, 30g, 30h of different physical properties. In still further exemplary embodiments, a peaked valve structure 100 may contain sheet guards 30a, 30b, 30c, 30d, 30e, 30f, 30g, 30h each of different physical properties.

In some exemplary embodiments, the angle of sheet guards 30a, 30b, 30c, 30d, 30e, 30f, 30g, 30h relative to the direction of the flow passing through peaked vent structure 100 may also be altered. The angle of sheet guards 30a, 30b, 30c, 30d, 30e, 30f, 30g, 30h may be adjusted between 0° and 80° relative to the direction of flow, with the angle perpendicular to flow being 0°, however, it the preferred embodiment keeps the angle of sheet guards 30a, 30b, 30c, 30d, 30e, 30f, 30g, 30h within the critical range of 40° to 60°.

In the exemplary embodiment shown, sheet guards 30a, 30b, 30c, 30d, 30e, 30f, 30g, 30h are releasably attached along a single side, or attachment surface, to base 10 by attachment devices 15a, 15b, 15c, 15d which are clamps. Clamps allow sheet guards 30a, 30b, 30c, 30d, 30e, 30f, 30g, 30h to be quickly replaced or interchanged, whether for maintenance or to better control internal pressure and flow rate. In further exemplary embodiments, sheet guards 30a, 30b, 30c, 30d, 30e, 30f, 30g, 30h may be releasably attached to base 10 through any means known in the art, including, but not limited to, screws, bolts, vices, and other structures or devices, or combination of structures and devices, known in the art. In still further exemplary embodiments, sheet guards 30a, 30b, 30c, 30d, 30e, 30f, 30g, 30h may be permanently attached to base 10.

In some exemplary embodiments, peaked valve structure 100 may be specifically machined and manufactured to desired specifications. In other exemplary embodiments, peaked valve structure 100 may use off-the-shelf components, such as reed valves known in the art from motor bikes and other vehicles, which are then modified. In the exemplary embodiment shown, peaked valve structure 100 uses base 10 of a V-Force 8 Reed Valve known in the art, which is modified with various sheet guards, such as 30a, 30b, 30c, 30d, 30e, 30f, 30g, 30h.

In addition to changing the physical properties of sheet guards 30a, 30b, 30c, 30d, 30e, 30f, 30g, 30h, the number, size and shape of valve apertures 25 (not shown) may also be altered. In the exemplary embodiment shown, peaked valve structure 100 contains eight valve apertures 25a, 25b, 25c, 25d, 25e, 25f, 25g, 25h (not shown), each corresponding to one sheet guard 30a, 30b, 30c, 30d, 30e, 30f, 30g, 30h, respectively. In further exemplary embodiments, peaked valve structure 100 may contain more or fewer valve apertures 25 (not shown), and valve apertures 25 (not shown) may be differently arranged on pyramidal valve protuberances 20a, 20b.

In further exemplary embodiments, peaked valve structure 100 may be quasi-unique or of variable dimension. For example, peaked valve structure 100 may contain more or fewer pyramidal valve protuberances 20. In still further exemplary embodiments, valve apertures 25 (not shown) may be arranged on structures other than pyramidal valve protuberances 20.

Figure 2A:
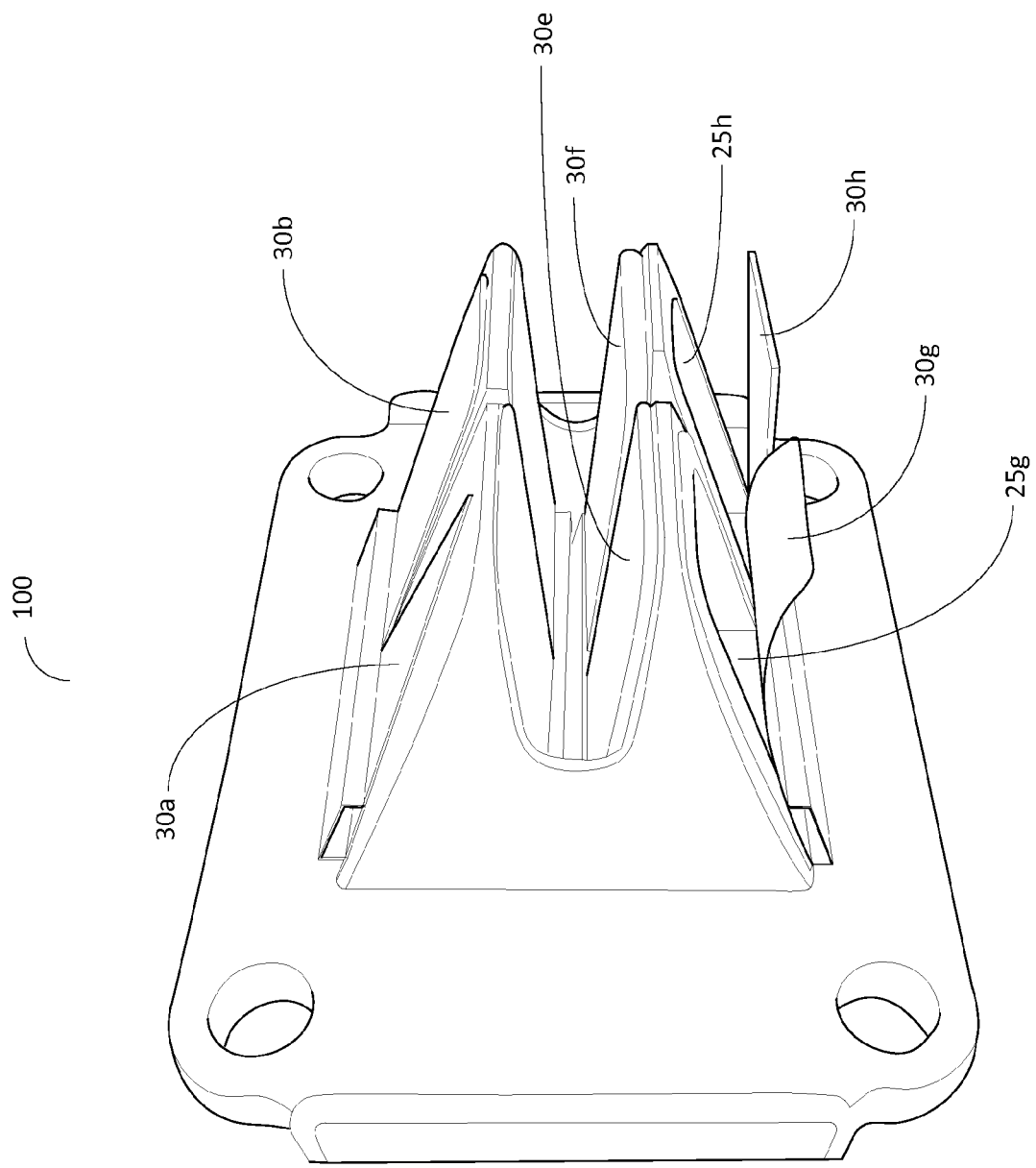
FIGS. 2a, 2b and 2c illustrate the variability of sheet guards for use with a space vehicle valve system.
Figure 2B:
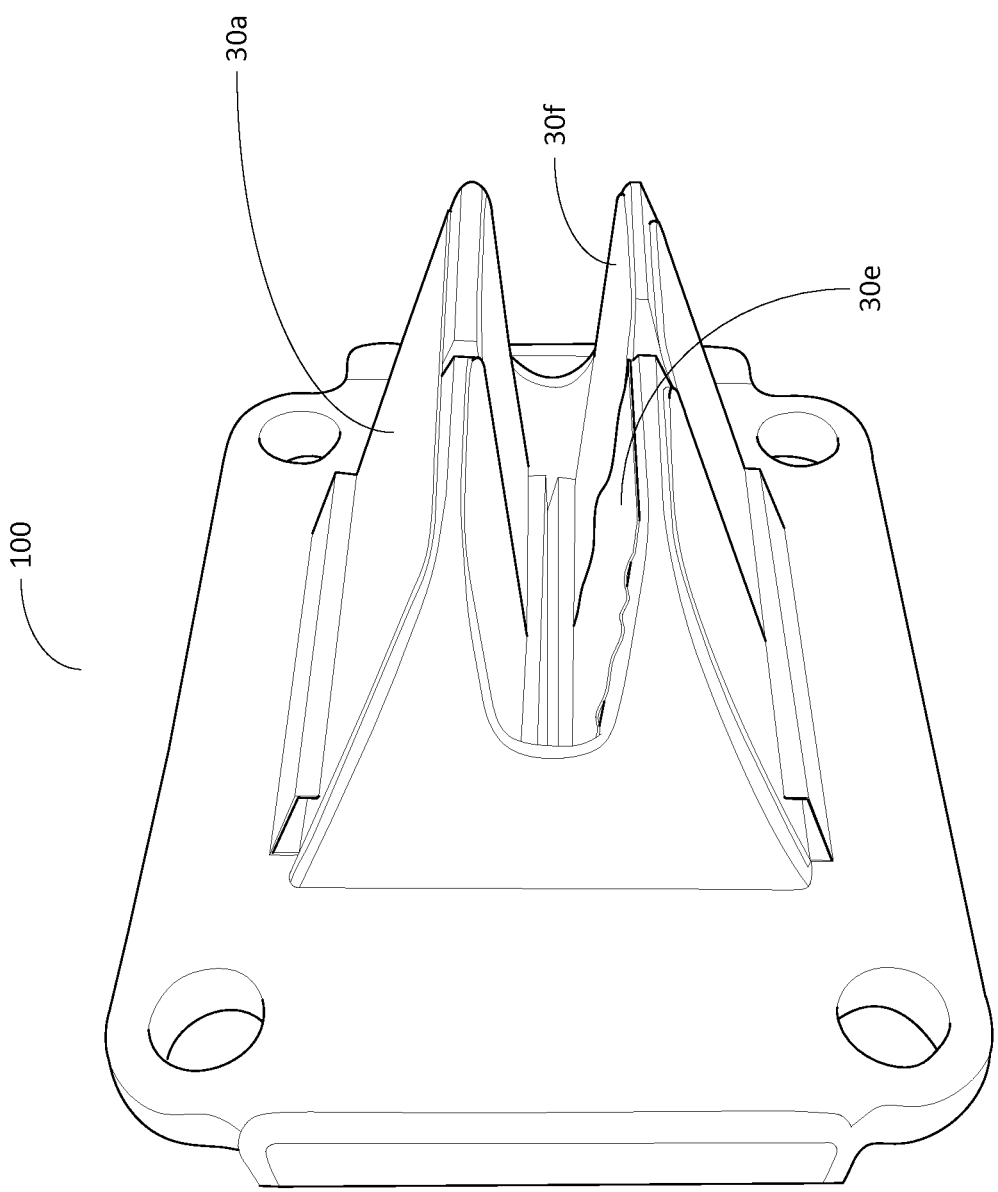
Figure 2C:
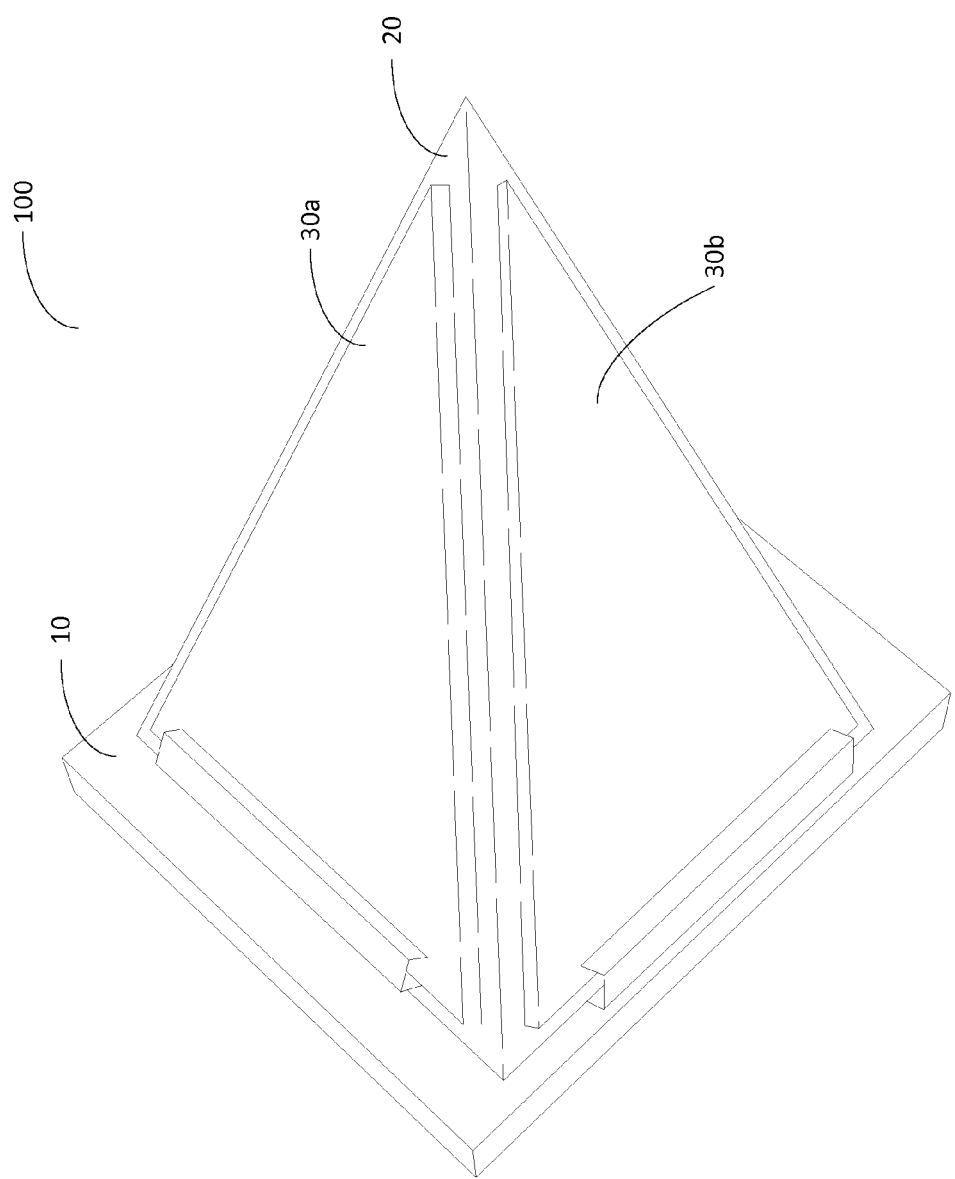

FIGS. 2a, 2b and 2c illustrate alternative exemplary embodiments of peaked valve structures 100 for use with space vehicle valve system 200 (not shown). As illustrated, peaked valve structures 100 contain sheet guards 30a, 30b, 30c, 30d, 30e, 30f, 30g, 30h of different physical properties.

In the exemplary embodiment illustrated in FIG. 2a, sheet guards 30a, 30b, 30c, 30d, 30e, 30f, 30g, 30h contain different physical properties. Sheet guard 30a is triangular, with the shape and size of the corresponding valve aperture 25a (not shown) altered to match the shape of sheet guard 30a. Sheet guard 30b is rectangular, with the shape and size of the corresponding valve aperture 25b (not shown) matching sheet guard 30b. In other exemplary embodiments, valve apertures 25 may not be configured to match corresponding sheet guards 30.

Thicknesses of sheet guards 30 may also vary, as illustrated by sheet guards 30e, 30f. Changing the thicknesses of sheet guards 30 changes the internal pressure at which sheet guards 30 respond, and the degree of the response.

Similarly, changes in the flexibility of sheet guards 30, as illustrated by sheet guards 30g, 30h, alter the activity of sheet guards 30. As illustrated, sheet guard 30g is of a flexible material, while sheet guard 30h is of a stiffer material. In addition to a potential difference in the pressure at which sheet guard 30g, 30h respond, the difference in sheet guards' 30g, 30h flexibility changes the amount valve aperture 25g, 25h exposed at a given pressure.

Similarly, FIG. 2b illustrates alternative sheet guards 30a, 30e, 30f. In the exemplary embodiment shown, valve apertures 25a, 25b (not shown) are covered by a single sheet guard 30a. In other exemplary embodiments, additional valve apertures 25 (not shown) may be covered by a single sheet guard 30. In further exemplary embodiments, a single valve aperture 25 (not shown) may be covered by multiple sheet guards 30.

As further illustrated by FIG. 2b, sheet guards 30 may be of different materials. In the exemplary embodiment shown, sheet guard 30e is of a lighter material, such as leather or fabric, while sheet guard 30f is of a heavier, stiffer material, such as plastic or carbon fiber. In further exemplary embodiments, sheet guard 30 may be made of any material which responds to pressure, including, but not limited to, fabrics, leather, plastics, polymers, carbon fiber, composites, metals, elastic materials, non-elastic materials, natural materials, synthetic materials, and any combination of these and other materials which may respond to pressure.

As illustrated by the exemplary embodiments shown in FIGS. 2a, 2b, and 2c, multiple physical properties of sheet guards 30 may be altered, including, but not limited to, geometry, shape, thickness, stiffness, flexibility, number of pressure-activated surfaces, length, angle, alignment, material, and combinations of these properties. The specific physical properties of a given sheet guard 30 are specifically calculated to achieve a target flow rate and maintain a target maximum internal pressure inside a vessel. Sheet guards 30 may be selectively interchangeable to provide accurate and precise control of internal pressures and flow rates.

The physical properties of a given sheet guard 30 are based on a formulaic relationship used to determine target flow rate and internal pressure. This formula considers the effective open area of a valve aperture 25, which varies depending on the momentary internal pressure and how much a sheet guard 30 exposes a valve aperture 25 at that given pressure, and the coefficient of discharge at that effective open area. The coefficient of discharge is therefore continually changing. Because the coefficient of discharge is non-linear, the formulaic relationship describing target flow rate and internal pressure is also non-linear.

FIG. 2c illustrates an exemplary peaked valve structure 100 with a different variable dimension. As illustrated in FIG. 2c, peaked valve structure 100 is square pyramidal, have a squared base with a single pyramidal valve protuberance 20 containing four valve apertures 25 (not shown). Sheet guards 30a, 30b, (30c, 30d not shown) are triangular to match the shape of valve apertures 25 (not shown).

In further exemplary embodiments, peaked valve structure 100 may be any dimensionally variable configuration known in the art to provide at least one surface which may contain a valve aperture 25 (not shown) covered by at least one sheet guard 30. Peaked valve structures 100 may also contain any number of pyramidal valve protuberances 20 with any number of sides.

Figure 3:
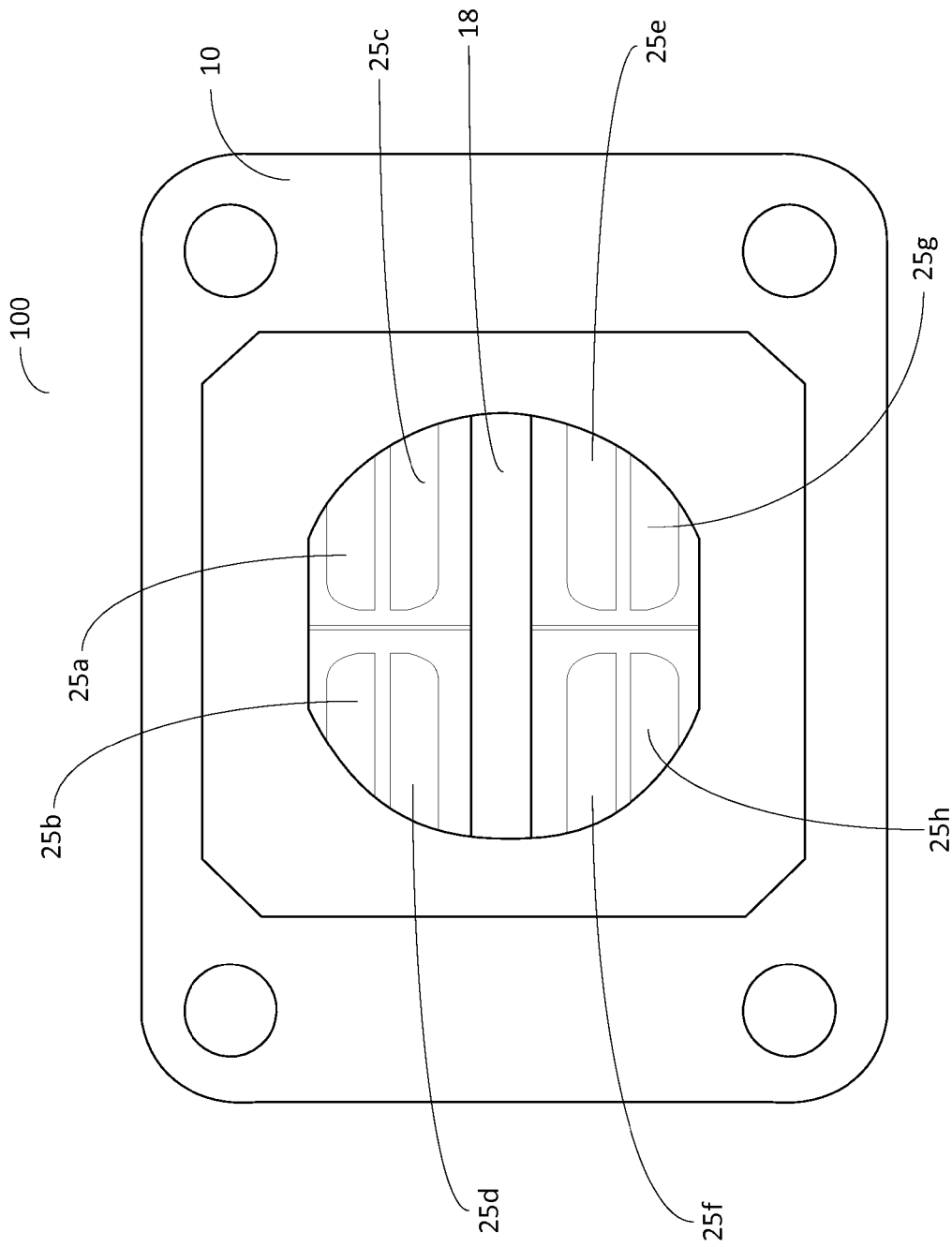
FIG. 3 is an interior view of an exemplary peaked valve structure.

FIG. 3 is an interior view of an exemplary embodiment of a peaked valve structure 100. Base 10 creates internal partition 18 which divides and directs flow into pyramidal valve protuberances 20a, 20b (not shown) and out valve apertures 25a, 25b, 25c, 25d, 25e, 25f, 25g, 25h. In further exemplary embodiments, peaked valve structure 100 may contain more or fewer valve protuberances, and valve protuberances may be of any shape or configuration which allows flow. Internal partition 18, or partitions, may therefore be designed to divide and direct flow accordingly.

Figure 4:
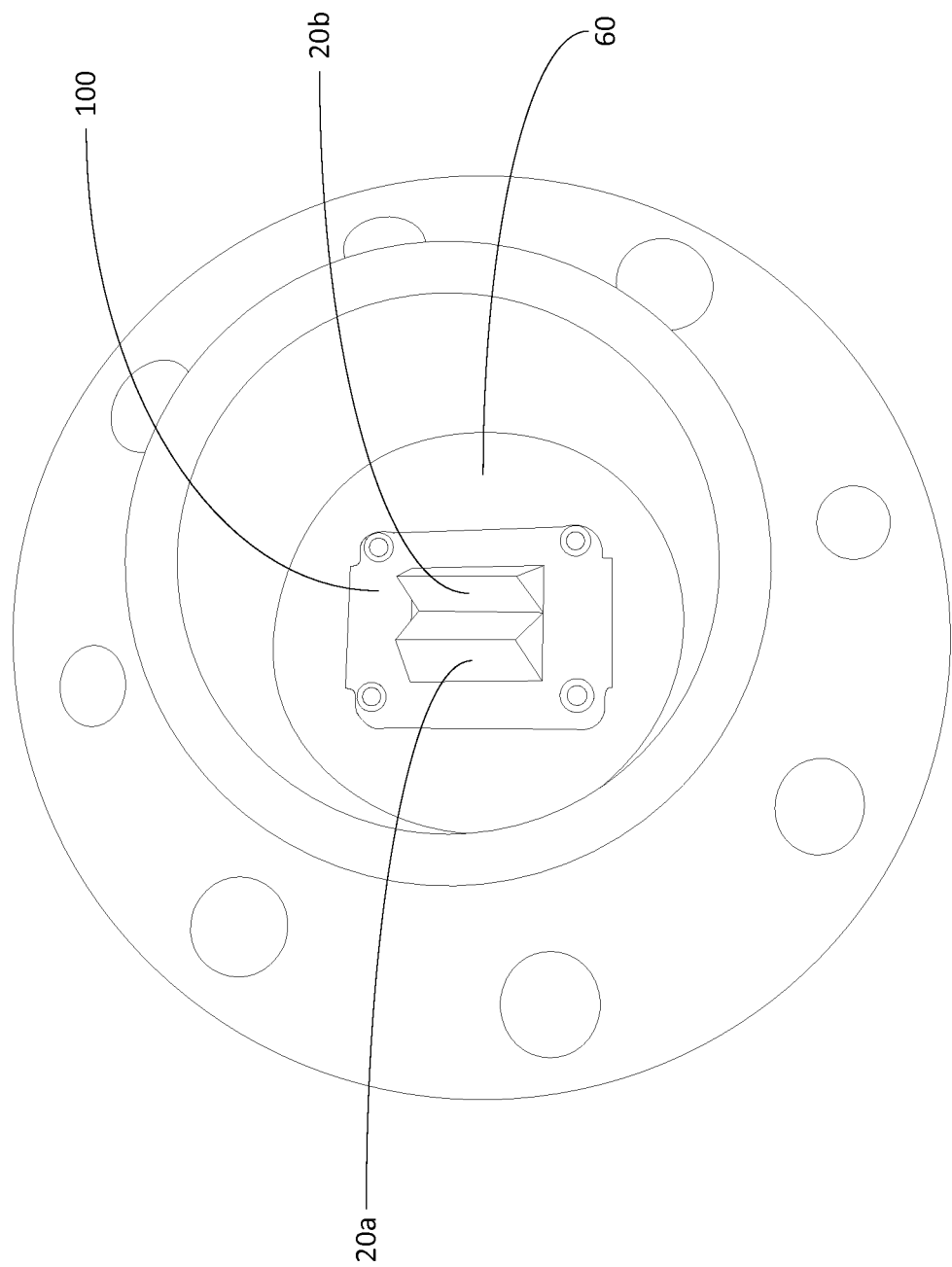
FIG. 4 is an exemplary embodiment of a peaked valve structure attached to a housing covering a purge aperture.

FIG. 4 illustrates an exemplary peaked valve structure 100 attached to housing 60. Base 10 is secured to housing 60 in alignment with purge aperture site 63 (not shown). In the exemplary embodiment shown, peaked valve structure 100 is removably attached to housing 60 with pyramidal valve protuberances 20a, 20b facing outward. As pressure within the chamber defined by housing 60 increases to greater than the pressure on the exterior of housing 60, sheet guards 30 (not shown) react and allow flow through valve apertures 25 (not shown) to maintain a target internal pressure on the inside of housing 60.

Figure 5:
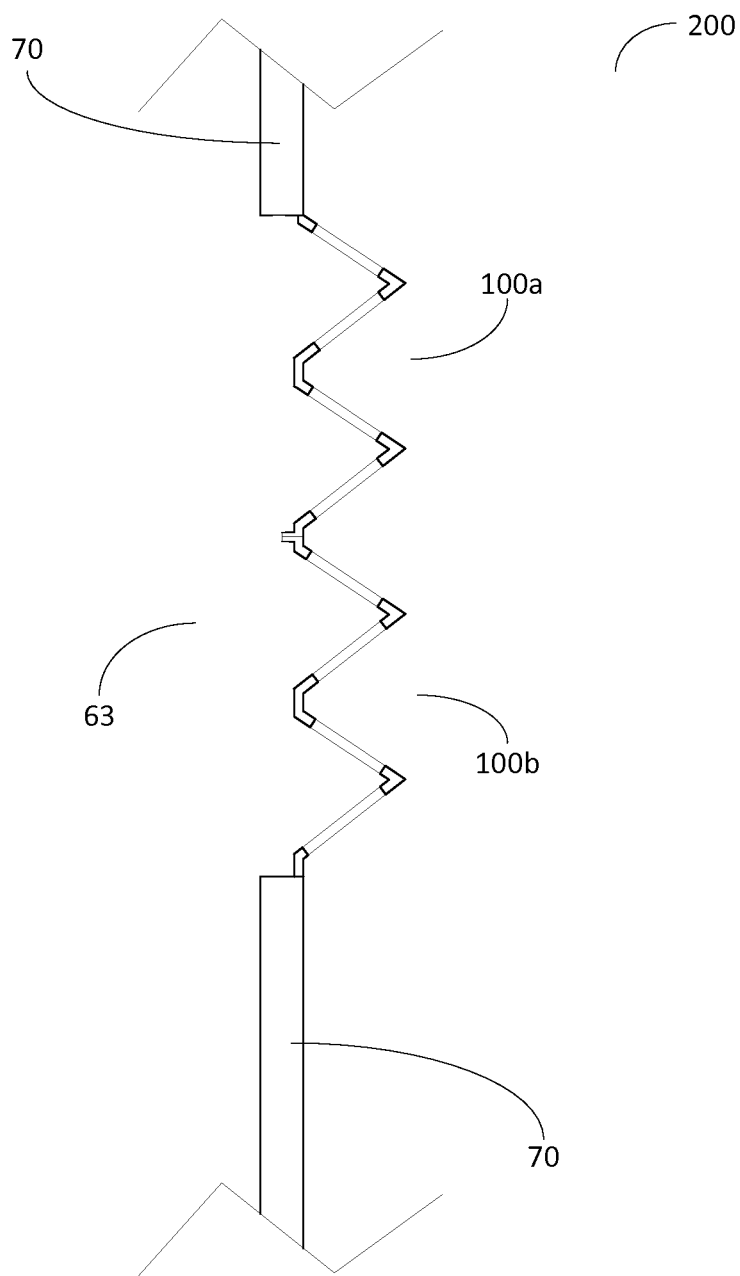
FIG. 5 is an exemplary embodiment of a space vehicle valve system.

FIG. 5 is an exemplary embodiment of space vehicle valve system 200 in use on a single purge aperture site 63 of rocket housing 70. Peaked valve structures 100a, 100b are located on surface of rocket housing 70 at purge aperture site 63. Each of peaked valve structure 100a, 100b contains physically and structurally different sheet guards 30 (not shown), which are specifically configured to maintain the rocket's target internal pressure, with flow rates proportional to a given internal pressure.

In further exemplary embodiments, peaked valve structures 100a, 100b may be flush mounted or recessed on rocket housing 70. In still further exemplary embodiments, peaked valve structures 100a, 100b may contain additional coverings, such as screens, shields, contours, or other covers to mitigate vortex shedding, among other issues.

As illustrated in FIG. 5, peaked valve structures 100a, 100b are in parallel, which allows for an adjustable flow rate over a range of pressures. In further exemplary embodiments, more or fewer peaked valve structures 100 may be used at a given purge aperture site 63.

In the exemplary embodiment shown, purge aperture site 63 consists of a single purge aperture. In further exemplary embodiments, purge aperture site 63 may be subdivided into multiple individual purge apertures, each corresponding to a single peaked valve structure 100 or system of peaked valve structures 100 at a given purge aperture site 63.

When determining the geometric and physical properties for sheet guards 30 (not shown), it is necessary to first determine the target internal pressure to be maintained and the target flow rate. For example, to maintain higher flow rates at a lower internal pressure, pressure-activated surfaces which have a larger response to low pressures are desired, and the physical characteristics of the sheet guards 30 are designed accordingly.

Because internal pressures fluctuate, it is necessary to provide a plurality of differently configured pressure-activated surfaces at a single purge aperture site 63 on rocket housing 70. While sheet guards which respond at low pressures accurately maintain the desired internal pressure at low pressures, increased internal pressures may overload peaked valve structures 100 with such properties. It is therefore desirable to provide additional peaked valve structures 100 which respond at greater internal pressures and provide an increased flow rate at those higher internal pressures.

In the exemplary embodiment shown in FIG. 5 peaked valve structures 100 are removably attached to rocket housing 70. Peaked valve structures 100 may therefore be removed and interchanged as necessary. In further exemplary embodiments, peaked valve structures 100 may be permanently attached to rocket housing 70. In some exemplary embodiments, sheet guards 30 may be permanently or removably attached to peaked valve structures 100.

Figure 6:
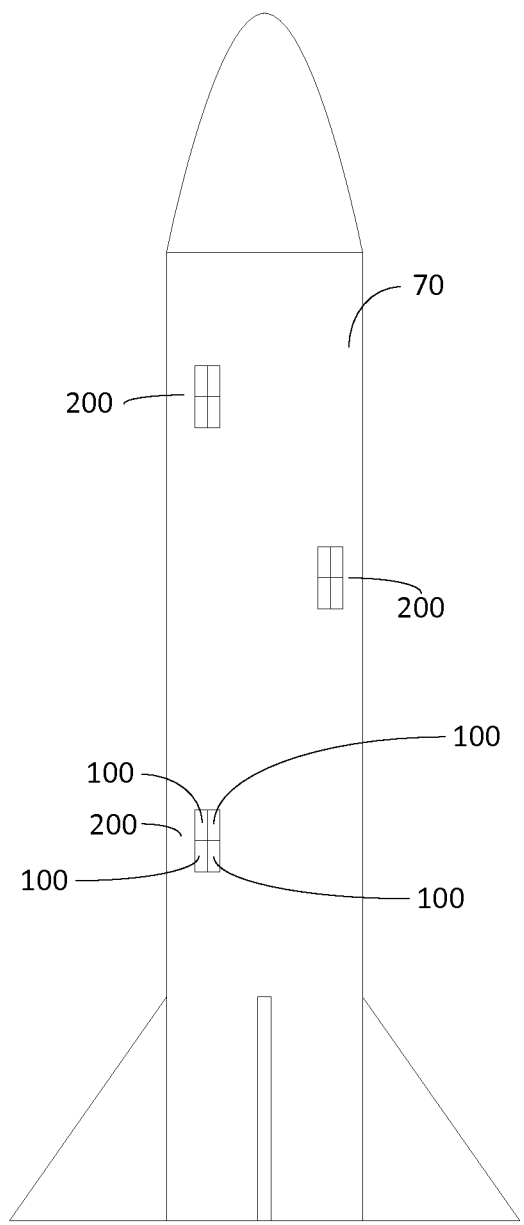
FIG. 6 is an exemplary space vehicle valve system in use on a rocket.

FIG. 6 is an exemplary embodiment of space vehicle valve system 200 in use on rocket housing 70. As illustrated, rocket housing 70 contains multiple purge aperture sites 63 (not shown), each of which may be associated with a target internal pressure and target flow rate at a given pressure.

Each purge aperture site 63 (not shown) contains a plurality of peaked valve structures 100 removably attached to rocket housing 70. The physical properties of sheet guards 30 (not shown) of each peaked valve structure 100 are specifically chosen based on the calculated target internal pressure and target flow rate.

Depending on the target internal pressure and target flow rate at a given purge aperture site 63 (not shown), the physical properties of sheet guards 30 (not shown) may be identical, similar, or dissimilar, both on a given peaked valve structure 100 or within a given space vehicle valve system 200.

At low internal pressures, only peaked valve structures 100 with low cracking pressures (e.g., a low pressure differential between the higher internal pressure and lower external pressure) will open. As internal pressure increases, additional peaked valve structures 100 will open, increasing the amount of gas flow out of rocket housing 70, and creating a stronger purge gas stream, to maintain a target internal pressure and/or changing the amount of purge gas flow at a given location.

Because peaked valve structures 100 are primarily designed to open when the internal pressure is greater than the external pressure, added external pressure on a partial area of rocket housing 70, such as pressure caused by wind, rain or other environmental conditions, will keep peaked valve structures 100 closed at low flow rates. At nominal flow rates, foreign objects and debris cannot overcome the gas velocity coming through the valve opening. It is therefore less likely that rain and other debris will enter rocket housing 70.

Figure 7:
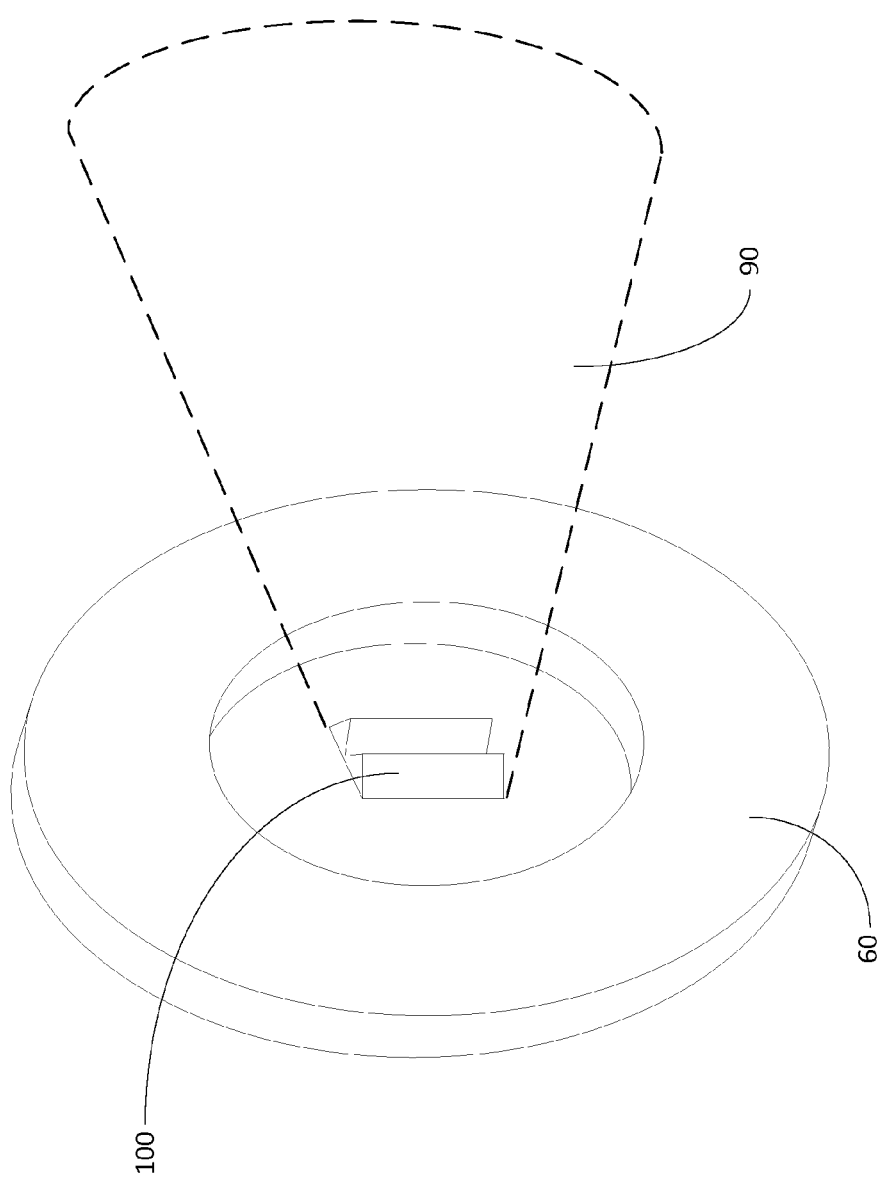
FIG. 7 illustrates an exemplary acoustic cone for a peaked valve structure.

FIG. 7 illustrates an exemplary acoustic cone 90 created by peaked valve structure 100 on housing 60. As gases are purged through peaked valve structure 100, noise is generated in a limited area identified as acoustic cone 90. In the exemplary embodiment shown, acoustic cone 90 is a cone of approximately 35 degrees extending downstream from peaked valve structure 100, and defines the physical area around peaked valve structure 100 in which potentially harmful acoustical energy is generated as gases are released from peaked valve structure 100. In further exemplary embodiments, acoustic cone 90 may be a cone in the range of 20-45 degrees extending from peaked valve structure 100, with a majority of the acoustical energy directed at a critical acoustic cone 90 range of 30-40 degrees.

As one moves outward from acoustic cone 90, the acoustical energy decreases significantly, and observers, workers or other personnel outside acoustic cone 90 may safely omit ear protection. Acoustical energy is therefore not evenly distributed around peaked valve structure 100.

In some exemplary embodiments, the angle of the sheet guards on a peaked valve structure 100 may be altered to change the acoustic cone 90 and provide more or less directionality of acoustical energy. In further exemplary embodiments, changes in a sheet guards' other physical properties (e.g., shape, material, flexibility) may influence an acoustic cone 90.

What is claimed is:

1. A spacecraft valve system comprising:
   an outer shell of a spacecraft which is visible and exposed to the ambient air;
   wherein said spacecraft outer shell is structurally modified to include at least one mounting aperture, over which all components of at least one peaked valve are mounted to commune with environment external to said outer shell;
   wherein said spacecraft outer shell is adapted to withstand widely varying external pressures due to flight and atmospheric conditions;

an internal cavity within an interior of said spacecraft outer shell having a controlled internal pressure and a controlled purge gas flow rate;

a purge gas stream which flows through said aperture from said internal cavity to an exterior of said spacecraft outer shell in order to maintain said internal cavity at said controlled internal pressure and to maintain said internal cavity purge gas flow rate;

wherein said spacecraft outer shell has a plurality of quasi-unique variable dimension peaked valve structures, each of said peaked valve structures having at least one interchangeable sheet guard fixedly connected to said peaked valve structure at an attachment segment and covering at least one valve aperture, wherein said sheet guard has an inner pressure-activated surface and an outer surface; and wherein said sheet guard moves outwardly from said peaked valve structure when said inner pressure-activated surface is in structural contact with said purge gas stream at an internal pressure sufficient to activate said sheet guard.

2. The system of claim 1 wherein each of said sheet guards is interchangeable and may be replaced with another sheet guard having alternate physical properties.

3. The system of claim 1 wherein each of said sheet guards varies in size.

4. The system of claim 1 wherein each of said sheet guards has a different stiffness k.

5. The system of claim 1 wherein each of said sheet guards has a different geometric shape.

6. The system of claim 1 wherein each of said sheet guards has a different thickness.

7. The system of claim 1 wherein each of said sheet guards has a different flexibility.

8. The system of claim 1 wherein each of said sheet guards has a different cracking pressure.

9. The system of claim 1 wherein each of said peaked valve structures has a quasi-unique shape that is distinct from the shape of the other of said peaked valve structures.

10. The system of claim 1 wherein each of said sheet guards is configured to move outwardly from said peaked valve structure when said controlled internal pressure is greater than an external pressure.

11. The system of claim 1 wherein at least two of said peaked valve structures contain a different number of said sheet guards.

12. The system of claim 1 wherein at least two of said sheet guards are identical.

13. The system of claim 1 wherein said sheet guards are selectively removable from said peaked valve structure.

14. The system of claim 1 wherein each of said peaked valve structures is associated with an acoustic cone.

15. The system of claim 14 wherein said acoustic cone is between 20 and 45 degrees.

16. The system of claim 14 wherein said acoustic cone is between 30 and 40 degrees.

17. A space vehicle valve system comprising:

an outer shell of a spacecraft which is visible and exposed to the ambient air;

wherein said spacecraft outer shell is structurally modified to include a plurality of aperture sites, each of said aperture sites containing at least one or more mounting apertures;

wherein over at least one or more mounting apertures all components of at least one quasi-unique variable dimension peaked valve structure are mounted to commune with environment external to said outer shell;

wherein said spacecraft outer shell is adapted to withstand widely varying external pressures due to flight and atmospheric conditions;

an internal cavity within an interior of said spacecraft outer shell having a controlled internal pressure and a controlled purge gas flow rate;

a plurality of purge gas streams which flows through said aperture sites from said internal cavity to an exterior of said spacecraft outer shell in order to maintain said internal cavity at said controlled internal pressure and to maintain said internal cavity purge gas flow rate;

wherein said spacecraft outer shell has a plurality of quasi-unique variable dimension peaked valve structures, each of said peaked valve structures containing at least one valve aperture and having a plurality of interchangeable sheet guards fixedly connected to said peaked valve structure at an attachment segment and covering said valve apertures, wherein said sheet guard has an inner pressure-activated surface and an outer surface;

wherein said sheet guard moves outwardly from said peaked valve structure when said inner pressure-activated surface is in structural contact with said purge gas stream at an internal pressure sufficient to activate said sheet guard.

18. The system of claim 17 wherein said quasi-unique variable dimension peaked valve structures are selectively attached to said housing.

19. The system of claim 17 wherein at least two of said sheet guards have a different cracking pressure.

20. The system of claim 17 wherein each of said aperture sites contains at least two of said peaked valve structures.

* * * * *